United States Patent [19]

Roth

[11] 4,265,851
[45] May 5, 1981

[54] PROCESS FOR MOULDING CELLULAR POLYCARBODIIMIDE

[75] Inventor: Jacques Roth, Strasbourg, France

[73] Assignee: Roth Freres S.A., Strasbourg-Meinau, France

[21] Appl. No.: 931,952

[22] Filed: Aug. 8, 1978

Related U.S. Application Data

[63] Continuation of Ser. No. 738,177, Nov. 2, 1976, abandoned.

[30] Foreign Application Priority Data

Nov. 17, 1975 [FR] France .............................. 75 35563
Sep. 2, 1976 [FR] France .............................. 76 27056

[51] Int. Cl.³ ...................... B29C 17/00; B29D 27/00
[52] U.S. Cl. ...................................... 264/321; 264/41
[58] Field of Search ................. 264/321; 521/901, 902

[56] References Cited

U.S. PATENT DOCUMENTS

| | | | |
|---|---|---|---|
| 3,398,224 | 8/1968 | Spencer | 264/321 |
| 3,443,007 | 5/1969 | Hardy | 264/321 |
| 3,632,557 | 1/1972 | Brode et al. | 528/28 |
| 3,816,233 | 6/1974 | Powers | 264/321 |
| 3,860,537 | 1/1975 | Graham et al. | 264/321 |
| 3,923,948 | 12/1975 | Jackson | 264/321 |
| 3,933,699 | 1/1976 | Kan et al. | 521/901 |
| 3,981,829 | 9/1976 | Cenker et al. | 521/901 |
| 4,014,809 | 3/1977 | Kondo et al. | 252/182 |
| 4,067,820 | 1/1978 | Wagner et al. | 521/901 |
| 4,153,783 | 5/1979 | Gaglianl et al. | 521/110 |

Primary Examiner—W. E. Hoag
Attorney, Agent, or Firm—Young & Thompson

[57] ABSTRACT

The disclosure is of a process for moulding cellular polycarbodiimide, characterized in that it consists essentially in heating a panel by radiation and direct contact in a mould-die assembly, in compressing this panel when the foam reaches its softening point, so as to increase its density, in deforming it and rendering the material less friable, more elastic, smooth, calendered and of higher mechanical quality, while retaining its inherent qualities of non-inflammability, and finally in slightly cooling the mould after the moulding, for example by means of an air jet, so as slightly to harden the moulded product before the die is withdrawn and the said product is withdrawn from the mould.

7 Claims, 5 Drawing Figures

PROCESS FOR MOULDING CELLULAR POLYCARBODIIMIDE

This is a continuation of application Ser. No. 738,177, filed Nov. 2, 1976 now abandoned.

INTRODUCTION AND BACKGROUND OF THE INVENTION

The present invention is concerned with the field of the manufacture and transformation of synthetic materials, and relates to a process for the moulding of cellular polycarbodiimide.

The invention also has for object, by way of new industrial product, the product obtained by application of this process.

The cellular synthetic materials which exist at present on the market and serve for the production of moulded pieces for insulation, decoration, etc. generally present the drawback of all being more or less inflammable.

On the other hand cellular polycarbodiimide is available as a non-inflammable material classed M1 by the epiradiator test as published in the Official Journal of the French Republic.

However this material, which is of very low density of the order of 16 kg/cu.m., is extremely friable and occurs only in the form of panels or fashioned objects cut from blocks of polycarbodiimide.

By reason of this fragility, this friability, the cost of fashioning and the limits inherent in this process, from the point of view of its applications, polycarbodiimide has not hitherto been usable for articles which necessitate moulding and a certain mechanical strength.

The present invention has the purpose of remedying these drawbacks.

BRIEF SUMMARY OF THE INVENTION

In fact the invention has for object a process for moulding cellular polycarbodiimide which consists essentially in heating and then compressing panels in such manner as to increase their density, in deforming them and rendering the material less friable, more elastic, smooth, calendered and of higher mechanical quality, while retaining its inherent qualities of non-inflammability.

FURTHER DESCRIPTION AND ADVANTAGES OF THE INVENTION

According to one characteristic of the invention the heating of the panel is effected by radiation and by direct contact of a mould-die assembly which is self-heating.

According to another characteristic of the invention the compression of the panel is effected when the foam reaches its softening point.

In order to render the hot-compression operation easier, so as to obtain a piece with very smooth and calendered surface and with good mechanical resistance, this piece further having the property of perfectly matching the reliefs and hollows of the mould, and of permitting all forms of subsequent covering such for example as painting, covering with cloth, simulated leather or the like, the invention according to a further characteristic provides the possibility of modifying the cellular structure of the polycarbodiimide panel.

The panels of polycarbodiimide foam which serve for the manufacture of the moulded pieces are obtained from blocks of polycarbodiimide foam hitherto produced according to the following formula:

100 parts of methyl phenyl diisocyanate, such as the product Bayer 44 V 40, 5 parts of diphenyloresylphosphate, which is a fireproofing and plasticising agent, 4 to 6 parts of dimerisation activator such for example as the product Bayer PU 1835.

By mixture of these products a block of polycarbodiimide foam is obtained after expansion and polymerization.

However the blocks of foam having this composition and the panels cut from these blocks have a cellular structure possessing a large majority of open and intercommunicating cells, and very few closed cells.

According to one characteristic of the invention, to the composition based upon polycarbodiimide there is added a chemical product having a tensio-active action, so as to modify the characteristics of the foaming mixture which expands and polymerises in the same manner as previously, but the obtained foam blocks have a modified cellular structure since they possess an infinitely greater proportion of closed cells, this number of closed cells being in proportion to the quantity of introduced tensio-active agent.

According to another characteristic of the invention the tensio-active agent is a silicone oil such as the product DC 193 of Dow Corning, added to the initial cellular polycarbodiimide composition at the rate of 0.05 to 0.15 part.

The panels cut from the blocks of polycarbodiimide thus obtained can, by virtue of their higher percentage of closed cells, be easily hot-compressed and especially possess a smooth and solid surface after this transformation.

According to a variant of embodiment of the invention the process consists in applying the heat instantaneously and simultaneously with the compression to the surface of the piece to be shaped which must have a smooth calendered structure, of greater and remanent density.

According to one characteristic of the invention the working temperature of the mould-die assembly is preferably $175° C._{+15°}^{-0°}$.

The invention also has for object, by way of new industrial product, the product obtained by application of the above-described process and constituted by cellular polycarbodiimide whether or not comprising a tensio-active agent, and moulded by hot compression.

The invention will be further explained in the following description which relates to a preferred form of embodiment given by way of non-limitative example and explained with reference to the accompanying diagrammatic drawings.

BRIEF DESCRIPTION OF THE VIEWS IN THE DRAWINGS

In the said drawings:

FIG. 1 is a sectional view of a mould before moulding by the process according to the invention, FIG. 2 is a sectional view similar to FIG. 1, the mould being closed, FIG. 3 is a perspective view of a panel obtained by application of the process according to the invention, and FIGS. 4 and 5 are sectional views respectively along A—A and B—B in FIG. 3.

DETAILED DESCRIPTION OF THE PREFERRED EMBODIMENTS

Figure 1:
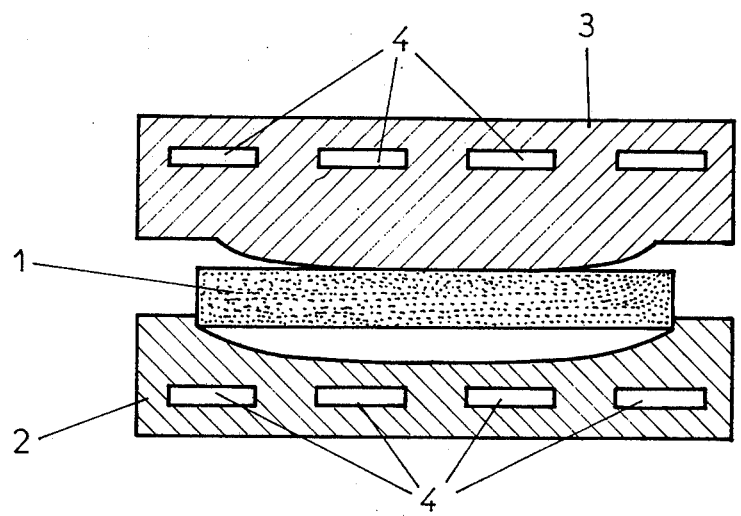
Figure 2:
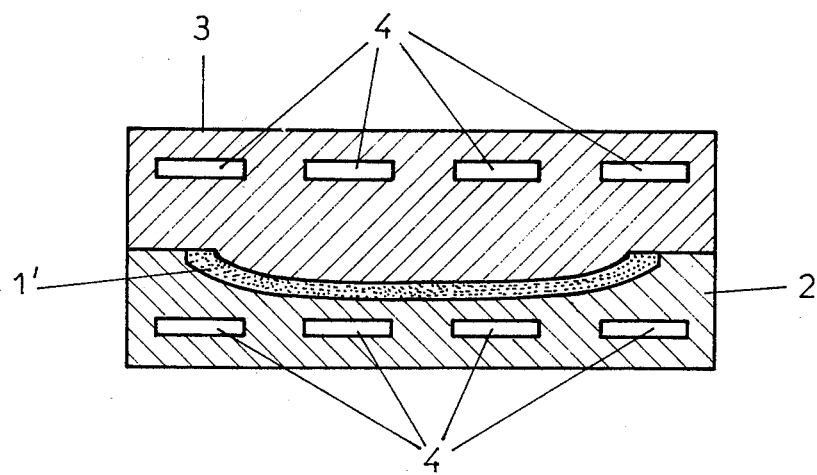

In accordance with the invention the process for moulding cellular polycarbodiimide consists essentially in heating and compressing a panel 1 between a mould 2 and a die 3 (FIGS. 1 and 2) so as to increase its density, deform it and render the material less friable, more elastic, smooth, calendered and of higher mechanical quality, while retaining the qualities of non-inflammability.

The panel 1 is heated between the assembly of mould 2 and die 3 by radiation and by direct contact, for example by means of electric resistors 4 immersed in the mass of the said assembly of mould 2 and die 3.

The panel 1 is then compressed by the die 3 in the mould 2, when the temperature of the foam reaches its ideal softening point. This is of the order of 130° C. for a foam of density of 16 kg/cu.m. The compression must be effected within a time period in any case below five seconds, in order to prevent any cooling of the foam. This is precisely rendered possible by the self-heating mould-die assembly, by virtue of which the foam is kept at its softening point throughout the compression cycle. By this operation the panel 1 is transformed into a moulded product 1' having a density of about 80 to 100 kg/cu.m., slightly elastic, with smooth surface and non-friable.

The temperature of the softening point is very important, since below this temperature the cellular polycarbodiimide is too brittle to be shaped, and above this temperature, or if the temperature is maintained too long, the material becomes friable.

The precise moment of the compression operation after the commencement of heating is predetermined as a function of the softening temperature and the thickness of the panel 1. Thus on the industrial scale it is possible to determine the cycle of the die 3 by means of an automatic timing mechanism.

After the shaping, the mould is slightly cooled, for example by means of an air jet, so as slightly to harden the panel 1', before the die 3 is withdrawn and the said panel 1' is removed from the mould.

Figure 3:
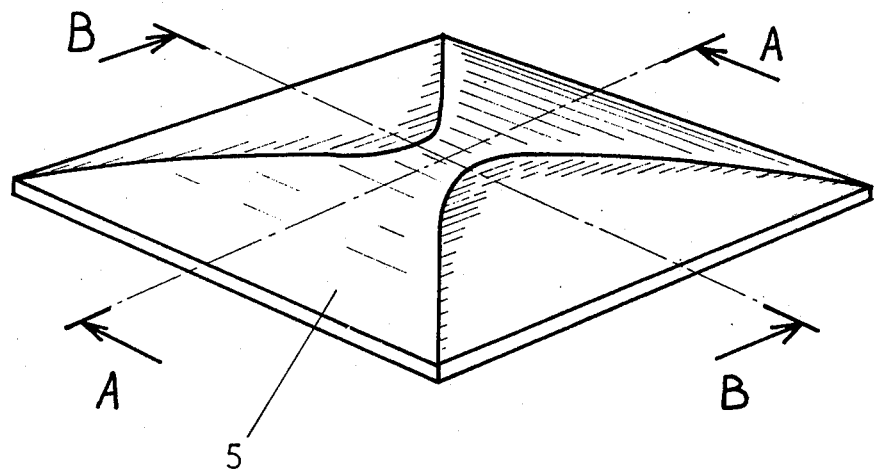
Figure 4:
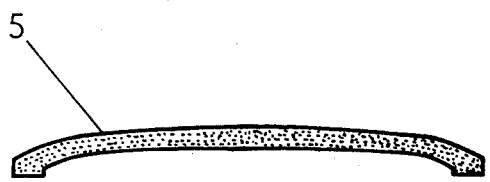
Figure 5:
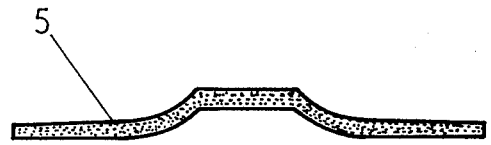

The invention also has for object, by way of new industrial product, a product 5 of any desired shape such for example as that represented in FIGS. 3 to 5, constituted by cellular polycarbodiimide moulded by hot compression.

In order to obtain a piece having a very smooth surface, possessing a high proportion of closed cells, perfectly matching the reliefs and hollows of the mould and permitting all forms of subsequent covering, the invention further provides for the addition of a tensioactive agent, such as silicone oil, at the rate of 0.05 to 0.15 part, to the composition based upon polycarbodiimide.

According to a variant of realisation of the invention the process consists in applying the heat instantaneously, and simultaneously with the compression, to the surface of the piece to be formed which must have a smooth calendered structure of higher and remanent density.

In this case the working temperature of the mould-die assembly is preferably $175°$ C.$_{+15°}{}^{-0°}$.

This variant will be described hereinafter with reference to an example of embodiment of a piece moulded from polycarbodiimide by increasing of the density of a panel of density 16 kg/cu.m. to a density of 40 to 100 kg/cu.m.

This initial density of the panel of 16 kg/cu.m. is a preferred density for the obtaining of the deformation and compression.

In order to manufacture a piece of moulded carbodiimide the visible face of which is obtained by the action of the die, the temperature of the die and the mould is brought to $175°_{+15°}{}^{-0°}$. The preheating by radiation and contact is reduced to a few fractions of a second, that is to say to the time necessary to place the panel of polycarbodiimide upon the mould and to lower the die in order to effect the moulding. During the positioning of the panel upon the mould the die, which effects the formation of the visible face, is placed at several centimeters distance from the panel, preferably about ten centimeters, in order to avoid all application of heat from this side.

The instantaneous arrival of heat simultaneously with the compression by the die then imparts to this surface a very great increase of the density over about 1 mm. thickness, this density decreasing very rapidly until being almost regular in the remainder of the cellular mass.

Thus if for example a panel of 60 mm. thickness and density 16 kg/cu.m. is compressed in order to obtain a moulded piece the different sections of which possess thicknesses of 20 mm., 10 mm., and 15 mm., densities of 48 kg/cu.m. are obtained at the section of 20 mm., 96 kg/cu.m. at the section of 10 mm. and 72 kg/cu.m. at the section of 15 mm.

The visible surface of the moulded piece thus obtained then possesses a superficial density of the order of 300 kg/cu.m. and is smooth and remanent.

Of course the rôles of the die and the mould can be exchanged for the purpose of a different realisation.

In the case of manufacture of a moulded piece of which the density ranges are situated between 100 and 300 kg/cu.m. and above, the variations are effected in the same sense, but a commencement is made from panels of much greater thickness. In this latter case the panel is preheated by radiation and direct contact between the die and the mould, which are both in contact or almost in contact with the panel, the temperature of which is situated between 130° and 180° C. according to the desired deformation. As soon as the foam reaches the desired softening point, the die compresses it into the mould.

By reason of a more progressive application of heat and compression, the increase of density is more distributed in the mass of the cellular structure. The increase of the surface density, that is to say over about 1 mm. thickness, is less in comparison with the remainder of the mass, this surface however remaining smooth and remanent, since benefitting from the high overall density of the polycarbodiimide foam.

By virtue of the process according to the invention it is possible to produce wall slabs, false ceilings, pipe insulation shells or the like.

The invention is more particularly applicable to the moulding of cellular polycarbodiimide.

Of course the invention is not limited to the form of embodiment as described and represented in the accompanying drawings. Modifications remain possible, especially as regards the working temperatures, without thereby departing from the scope of protection of the invention.

What is claimed is:

1. A process for moulding cellular polycarbodiimide, comprising producing a discrete friable panel of cured thermoplastic cellular polycarbodiimide containing a small but effective amount of silicone oil, compressing said cured panel for a period of time less than five seconds in a mould heated to a temperature above the softening temperature of the panel so as to increase its density and to deform it to a desired shape, said amount being effective to produce a smooth, elastic surface on said shape upon simultaneous heating and compression thereof, slightly cooling the mould after moulding, and removing said shape from the mould, said polycarbodiimide being heated only in said mold for said period.

2. A process as claimed in claim 1, in which said panel has a softening point of about 130° C. and a density of about 16 kg/m$^2$ prior to compression in the mould.

3. A process as claimed in claim 1, in which the temperature of the mould is about 175° to 190° C.

4. A process as claimed in claim 1, in which said cooling is effected by means of an air jet.

5. A process as claimed in claim 1, in which said amount is 0.05 to 0.15% by weight.

6. A moulded cellular polycarbodiimide shape produced by the process of claim 1.

7. A process as claimed in claim 1, in which said friable cured panel prior to moulding is a flat panel and after moulding is a panel of complex cross section.

* * * * *